US000001906H

United States Statutory Invention Registration [19]

[11] Reg. Number: H1,906

Brown

[45] Published: Nov. 7, 2000

[54] PAPERMAKING DRYER WITH PIVOTING VACUUM TRANSFER ROLLS

[75] Inventor: Dale A. Brown, Milton, Wis.

[73] Assignee: Beloit Technologies, Inc., Wilmington, Del.

[21] Appl. No.: 08/734,703

[22] Filed: Oct. 21, 1996

[51] Int. Cl.[7] ..... D21F 5/00; F26B 11/06

[52] U.S. Cl. ..... 34/117

[58] Field of Search ..... 34/115, 116, 117, 34/118, 120, 453, 454; 162/366, 367; 242/417.3; 226/180, 199

[56] References Cited

U.S. PATENT DOCUMENTS

| | | | |
|---|---|---|---|
| 4,666,073 | 5/1987 | DuFour | 226/23 |
| 5,065,529 | 11/1991 | Skaugen et al. | 34/117 |
| 5,248,390 | 9/1993 | Fissman et al. | 34/120 X |
| 5,544,422 | 8/1996 | Leitenberger | 34/118 X |

*Primary Examiner*—Harold J. Tudor

*Attorney, Agent, or Firm*—Dirk J. Veneman; Raymond W. Campbell; David J. Archer

[57] ABSTRACT

The top and bottom felts at the web transfer between two dryer sections in a single tier papermaking dryer are spaced by pivoting the vacuum roll over which the felt and web move. The vacuum roll is mounted to two pivot arms which are driven by inflatable air rides to alternately incline the roll toward the downstream felt, forming a sandwich of the two felts and the web, and to a spaced position. The short motion of the vacuum roll allows standard felt stretchers to be used, and permits rapid adjustment of the felt spacing.

8 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PAPERMAKING DRYER WITH PIVOTING VACUUM TRANSFER ROLLS

FIELD OF THE INVENTION

The present invention relates to the dryer section of a papermaking machine in general, and to apparatus for separating the felts in the draw between dryer sections in particular.

BACKGROUND OF THE INVENTION

Paper is made by forming a mat of fibers, normally wood fibers, on a moving wire screen. The fibers are in a dilution with water constituting usually above 95 percent of the mix. As the paper web leaves the forming screen, it may be still over eighty percent water. The paper web travels from the forming or wet end of the papermaking machine and enters a pressing section where, with the web supported on a felt, the moisture content of the paper is reduced by pressing the web to a fiber content of about forty-two percent. After the pressing section, the paper web is dried on a large number of steam heated dryer rolls, so the moisture content of the paper is reduced to about five percent.

One type of dryer is the apparatus manufactured by Beloit Corporation of Beloit, Wisconsin and sold under the trade name "Bel-Champ." The Bel-Champ dryer has a single tier of dryer upper rolls with vacuum reversing rolls disposed therebetween. As the web, supported by a felt, progresses through a single dryer section, typically composed of five or more dryer rolls, the same face of the web is repeatedly placed in contact with the heated dryer roll surfaces. To effectively dry both faces of the web, the first felt is directed away from the web and a second felt is brought into contact with the opposite face. Once supported on the second felt the web is led through a succeeding dryer section where the alternate face is placed in contact with the heated dryer rolls. The transfer of the web between dryer sections takes place in a fully supported draw between two vacuum rolls. Each felt extends from a vacuum roll to a felt roll which is spaced either above or below the vacuum rolls.

On occasion it becomes necessary to separate the felts on the order of one half inch. In the past this separation has been achieved by using air or hydraulic cylinders to move the felt rolls horizontally. However, in order to retain the felts on the rollers as they are moved, it is essential that the roll be advanced evenly. As a felt is typically wrapped in the range of 90 degrees around the felt roll, angling of the roll in motion may cause the felt to run off the machine. Even movement is effectively obtained by employing a large cross-shaft. Such shafts, however, are costly.

Furthermore, because the felt rolls must be spaced several feet from the vacuum rolls, the felt roll must be moved up to ten inches or more in order to achieve the desired separation of the felts of about one half inch. Additionally, this significant displacement of the felt rolls changes the lengths of the felt runs, requiring a stretcher assembly to take up the additional felt length. In order to accommodate the stretcher, the felt rolls must be moved slowly to insure that the stretcher has enough time to respond and maintain felt tension. As the felt rolls are spaced above and below the web, the separation operation is also difficult to observe.

What is needed is an economical mechanism for separating the felts in a dryer section break which is rapid and effective.

SUMMARY OF THE INVENTION

The single tier dryer of this invention has a first dryer roll mounted to a frame in a first dryer section, and a pivot arm mounted to the frame for pivoting about a cross-machine axis. A first vacuum roll is positioned downstream of the first dryer roll. The first vacuum roll is rotatably mounted to the pivot arm. A first felt is guided about the first dryer roll such that the web is disposed between the first dryer roll and the first felt for drying a first side of the web. The first felt then extends over the first vacuum roll. A second vacuum roll is mounted to the frame downstream of the first vacuum roll in a subsequent dryer section. A second dryer roll is mounted downstream of the second vacuum roll. A second felt is guided about the second dryer roll such that the web is disposed between the second dryer roll and the second felt for drying a second side of the web The second felt extends from the second vacuum roll to the second dryer roll, and the web is transferred from the first felt to the second felt between the first dryer roll and the second dryer roll. Inflatable air rides provide means for pivoting the pivot arm to pivot the first vacuum roll from a first position in which the first felt, the web, and the second felt are engaged, and a second position in which the first felt, the web, and the second felt are not simultaneously engaged.

It is a feature of the present invention to provide a dryer section with felts which may be rapidly separated at the section break.

It is also a feature of the present invention to provide a papermaking dryer with a mechanism for separating the felts at a section break which is easily visible to the machine operator.

It is a further feature of the present invention to provide a papermaking dryer which spaces the felts at a section break with minimal increase in the felt run length.

It is an additional feature of the present invention to provide a papermaking dryer with a mechanism for spacing the felt runs at the section break which is economical.

Further objects, features and advantages of the invention will be apparent from the following detailed description when taken in conjunction with the accompanying drawings.

DESCRIPTION OF THE PREFERRED EMBODIMENTS

Figure 1:
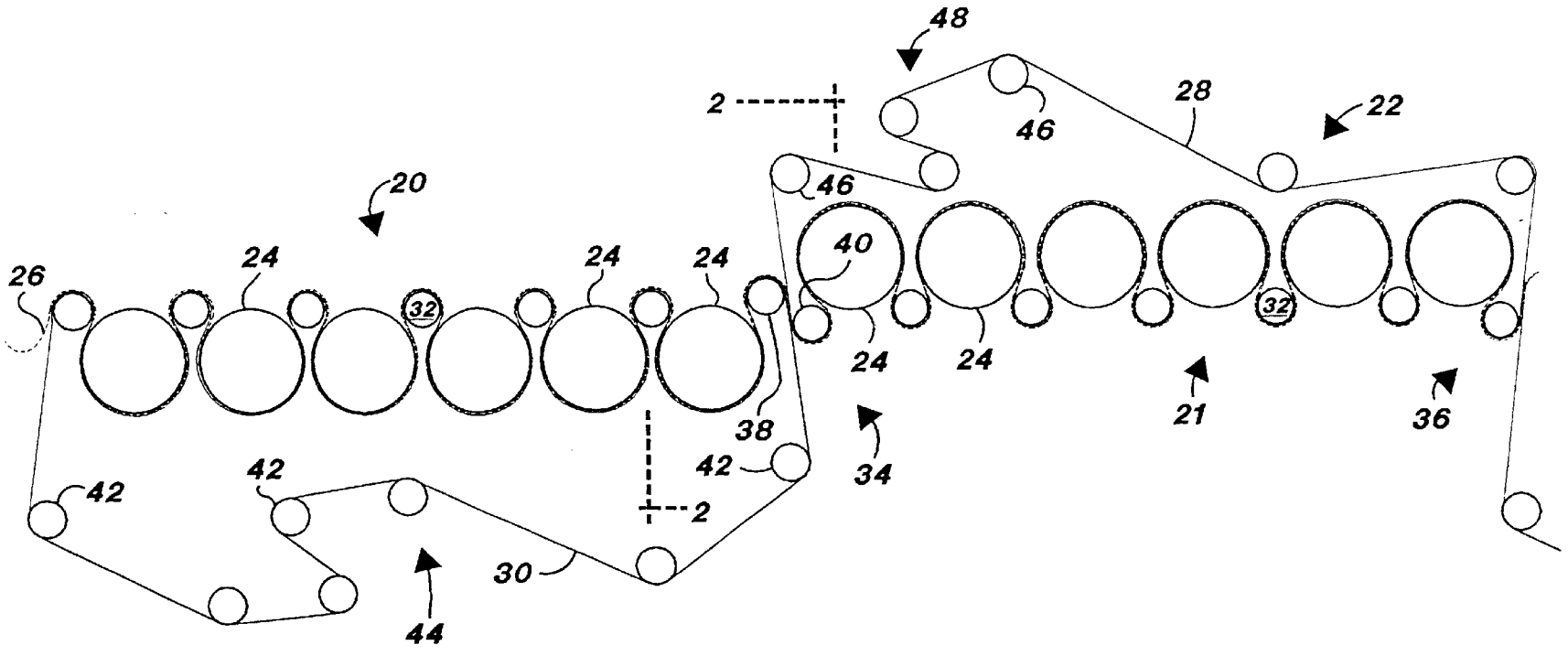
FIG. 1 is a schematic view of two sequential dryer sections in the papermaking dryer of this invention.
Figure 2:
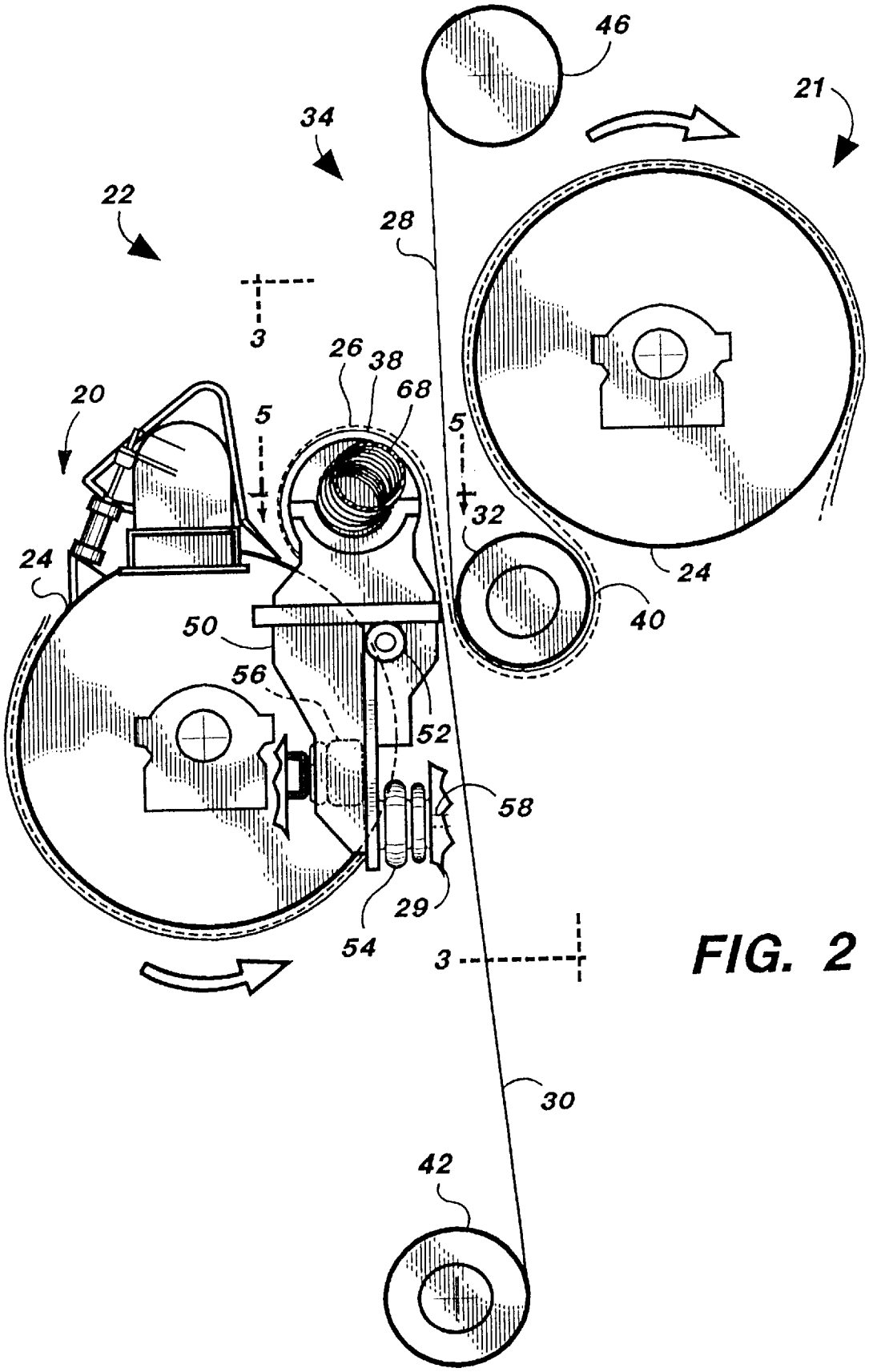
FIG. 2 is an enlarged side elevational view of the section break of the dryer of FIG. 1 taken at line 2—2.

Referring more particularly to FIGS. 1–9, wherein like numbers refer to similar parts, two sequential dryer sections 20, 21 of the dryer run 22 of a papermaking machine are shown in FIG. 2. The dryer run 22 is of the single tier type of the general type disclosed in U.S. Pat. No. 5,065,529, the disclosure of which is incorporated by reference herein. The dryer run 22 may have five or more dryer sections. Each dyer section 20, 21 has a plurality of larger diameter heated dryer rolls 24 about which a paper web 26 is guided to reduce the moisture content of the web. The dryer rolls are cylinders up to 400 or more inches wide in the cross machine direction which are rotatably mounted to a frame 29, as shown in FIG. 2. Throughout the dryer run 22, the web 26 is supported by alternating top felts 28 and bottom felts 30.

The web 26 is supported by a felt as it wraps partially around a dryer roll 24, preferably for more than 180 degrees. A vacuum roll 32 is mounted to the frame 29 between each pair of dryer rolls 24. The vacuum roll engages the supportive felt, and turns the web to guide it to the downstream dryer roll 24 within a particular dryer section.

To best achieve consistent drying of the web, and to prevent warping or distortion of the paper, the dryer run 22 alternately drys first one side and then the other of the web 26. In order to dry an alternate side of the web 26, the web must be transferred from the felt which is supporting the first side, to a second felt which will support the opposite side so that the first side may be placed in direct contact with subsequent dryer rolls 24. This transfer takes place at the section breaks 34, 36, where the upstream felt is directed away from the web, and the web is handed off or transferred to the downstream felt for drying of the alternate side of the web.

Figure 3:
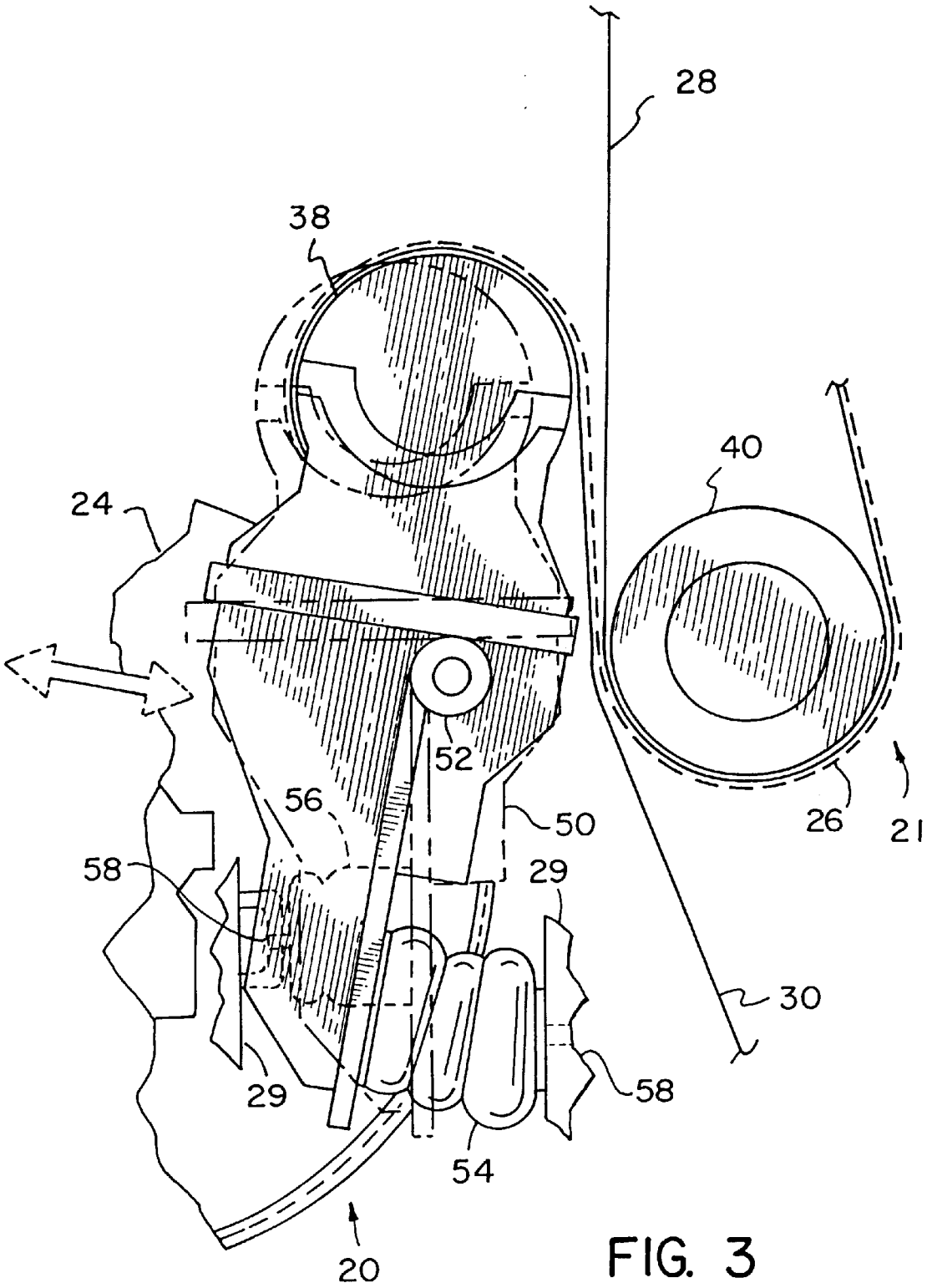
FIG. 3 is an enlarged side elevational view of the vacuum roll pivoting mechanism at the section break of FIG. 2 taken at line 3—3.
Figure 4:
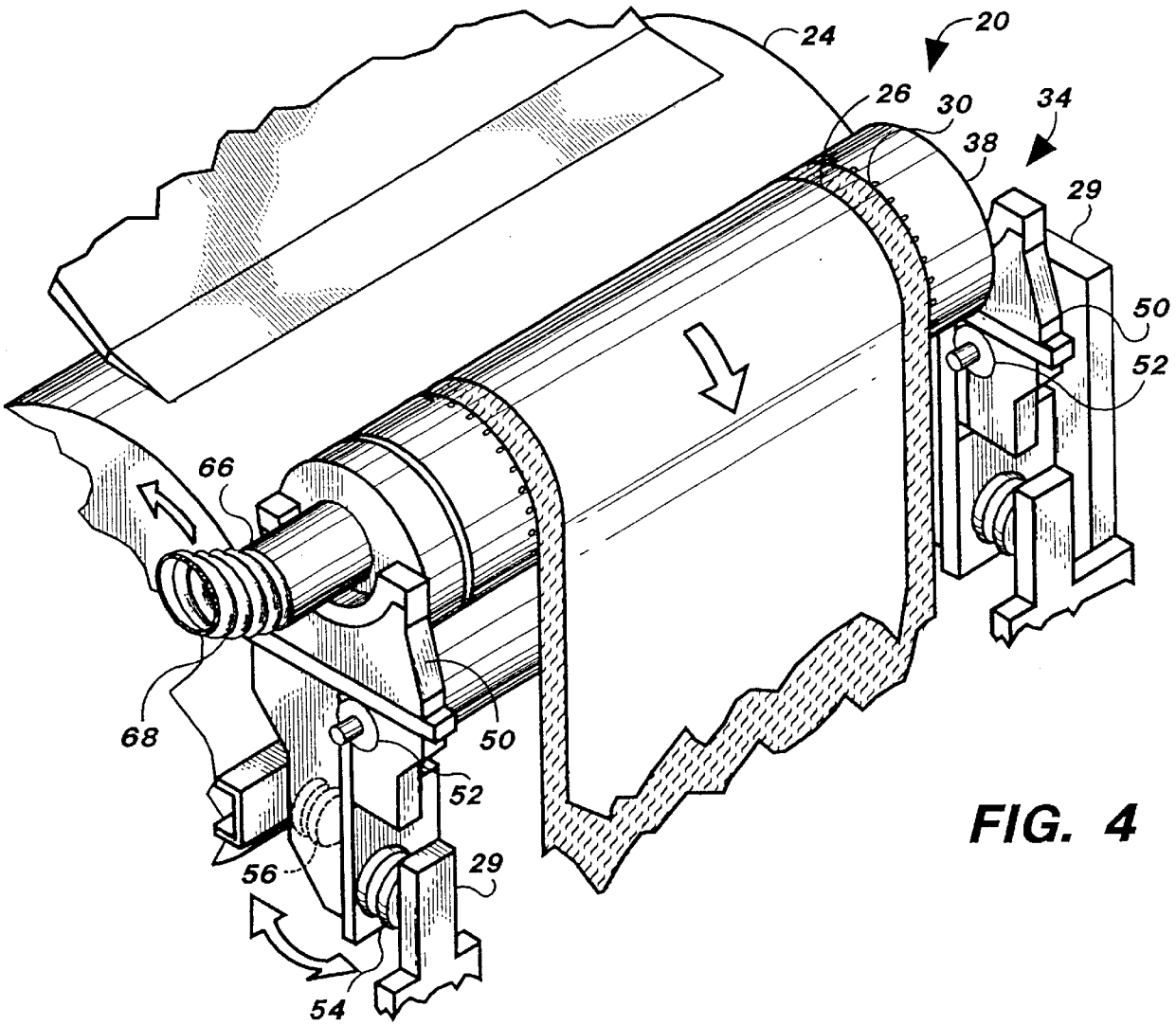
FIG. 4 is a fragmentary isometric view of the apparatus of FIG. 3.

A section break 34 is shown in FIGS. 2 and 3 at which the web 26 supported by a bottom felt 30 in a bottom-felted dryer section 20 is transferred to a top felt 28 to be conveyed through a top-felted dryer section 21. The path of the web 26 is from the dryer roll 24 of the bottom-felted dryer section 20, to a pivoting vacuum roll 38, to a fixed vacuum roll 40 and then to a dryer roll 24 in the top-felted dryer section 21.

The bottom felt 30 extends from pivoting vacuum roll 38 to a bottom felt roll 42 beneath the dryer rolls 24 of the dryer section 20. The bottom felt 30 is a continuous loop which extends through a stretcher assembly 44, indicated schematically in FIG. 1, and returns to engage the web at the inlet to that same dryer section 20. The stretcher assembly 44 comprises a number of felt rolls 42 which are mounted to allow slack to be removed from the bottom felt 30 as the length of the felt run and the felt itself change with conditions and time. The top felt 28 moves in to receive the advancing web 26 from an overhead felt roll 46 which is part of a top stretcher assembly 48.

The transfer arrangement of this invention will be discussed in the context of a transfer from a bottom-felted dryer section to a top-felted dryer section. However, it should be emphasized that the invention also encompasses similar arrangements for transferring the web from a top-felted dryer section to a bottom-felted dryer section.

As best shown in FIG. 3, under ordinary conditions, the bottom felt 30, the web 26, and the top felt 28 are engaged at the section break 34. However, under certain conditions it is desirable to space the two felts such that both are not in simultaneous contact with the web. For example, on start up of the dryer run, each section 20, 21 may be brought up to speed sequentially. Contact of the moving felt of an activated dryer section with the non-moving felt on subsequent section may cause wear and deterioration of both felts and is to be avoided. By spacing the top and bottom felts at the section breaks, it is possible to bring up all the dryer sections in a run and only bring the felts together once a web is introduced. At times the dryer operator will wish to visually inspect the web as it traverses the dryer run, the section break is an optimal position for this inspection, and by spacing the felts the web is made visible. Furthermore, in certain papermaking applications, one dryer section is allowed to run faster than the previous section, the thereby stretch the web. Binding of the paper between felts moving at different speeds is eliminated by spacing the two felts at the section break. In addition, when it comes time to replace a felt, the old felt is cut, and a new felt is attached thereto at a temporary seam and drawn through the dryer section. By spacing the felts at the section break, destructive pressure contact between the temporary seam and adjacent felts is avoided.

The dryer run 22 separates and engages the felts 28, 30 and the web 26 at the section break 34 by pivoting the pivoting vacuum roll 38 about an axis which extends in a cross-machine direction. As shown in FIG. 2, the vacuum roll 38 is mounted to two pivot arms 50 which are spaced on either side of the vacuum roll 38. The pivot arms 50 are mounted to the frame 29 at bearings 52. The bearings 52 define the cross-machine direction axis about which the pivot arms 50 pivot. The pivot axis is positioned downstream of the rotational axis of the vacuum roll 38. As the vacuum roll is substantially axisymmetric, the center of mass of the vacuum roll 38 is upstream of the pivot axis throughout the approximately six degrees of pivot travel of the pivot arm 50. There is thus a tendency for the vacuum roll 38 to assume an inclination away from the downstream dryer section. The means for pivoting the vacuum roll may include pneumatic or hydraulic actuators, mechanical linkages or cams, or other mechanical motion transmitters. In a preferred embodiment a first air ride 54 extends downstream from the frame 29 to the pivot arm 50, beneath the bearing 52. A second, smaller, air ride 56 extends upstream from the frame to the pivot arm 50. Each air ride is an inflatable elastic member, generally in the form of two connected flattened spheroids. By introducing air into the air ride through an air inlet 58, an air ride may be inflated. By venting air through the air inlet 58, an air ride may be deflated.

As shown in FIG. 3, the vacuum roll 38 is pivoted downstream by inflating the larger first air ride 54 to displace the pivot arm 50 upstream. The smaller second air ride 56 may be simultaneously deflated, or, preferably, the larger first air ride 54 may be allowed to simply overpower the second air ride 56 and compress the air therein. The two air rides 54, 56 thus work together to cushion any sudden impact or sharp vibrations as a result of pivoting the vacuum roll 38.

Figure 5:
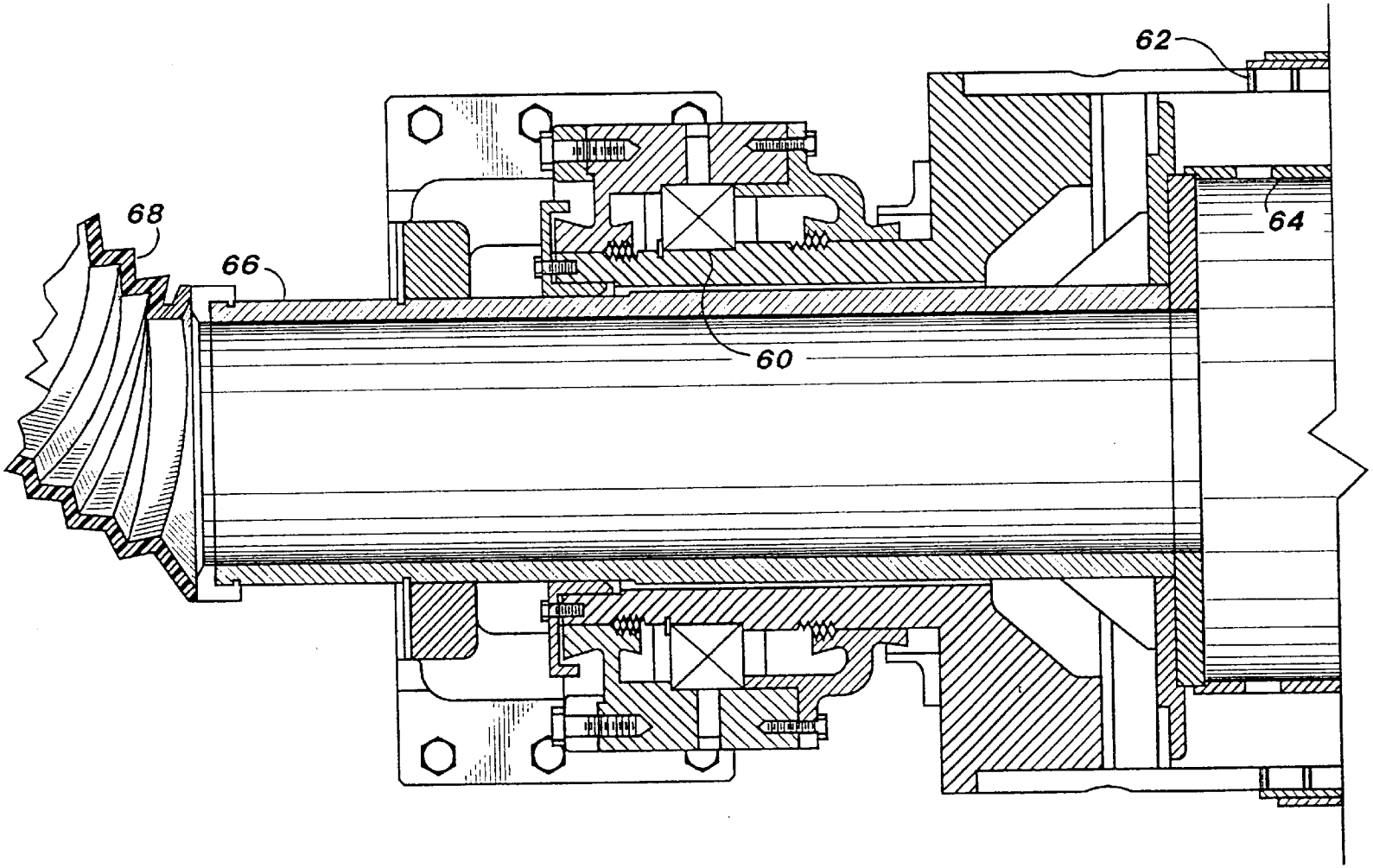
FIG. 5 is a fragmentary cross-sectional view of the apparatus of FIG. 2 taken along section line 5—5.

As shown in FIG. 5, the vacuum roll 38 is mounted to the two pivot arms 50 on roller bearings 60 for rotation as felt and web pass thereover. Air is withdrawn through perforations 62 in the vacuum roll surface and then through an air duct 64 which has wiping seals (not shown) which insure that vacuum is drawn only on the fraction of the vacuum roll over which the felt is wrapped. The air duct 64 is connected to a hollow shaft 66 which is fixed to the pivot arm 50 and which is connected by a flexible elastic hose or boot 68 to a source of vacuum.

When the vacuum roll 38 is pivoted downstream, the roll surface engages the web 26, which is supported on the bottom felt 30, against the top felt 28 which is advancing through the downstream dryer section 21 at the same velocity.

When it is desired to separate the felts 28, 30, for any reason, the larger air rides 54 are inflated to pivot the two pivot arms 50 upstream and disengage the bottom felt and web from the top felt. Approximately six degrees of pivot will space the felts about one half of an inch. A spacing of up to two inches may be desirable for certain applications.

Because of the location of the pivot arm-vacuum roll assembly center of mass with respect to the pivot axis of the assembly, should the large air rides 54 fail, the position of the vacuum roll 28 will failsafe to a nonengaged condition. Should the smaller air ride 56 fail, the force of gravity alone should retain the vacuum roll in a nonengaged condition.

Because the bottom felt 30 and the web 26 are wrapped approximately 180 degrees around the pivoting vacuum roll 28, there is not a need for precise positioning in advancing and retracting the roll 28. Because of this significant wrap, tilting of the vacuum roll 28 about a z-axis because of variations in inflation of air rides will not readily cause the felt to run off the roll.

Because the vacuum roll 28 is pivoted only a small amount to open up the desired spacing between the felts, the length of the bottom felt path is only slightly changed, hence a standard stretcher is sufficient to maintain proper tension in the felt. Furthermore, because there is such a small change in felt length when the vacuum roll moves in a direction generally perpendicular to the felt transfer sandwich area, the rolls can be moved quickly to achieve the optimum geometry sought, without delay while the stretcher adjusts the felt run.

An additional advantage of the arrangement of this invention is that the pivoting vacuum roll is in a location easily viewed by the machine operator, which provides for better visual control of the separation operation.

Figure 6:
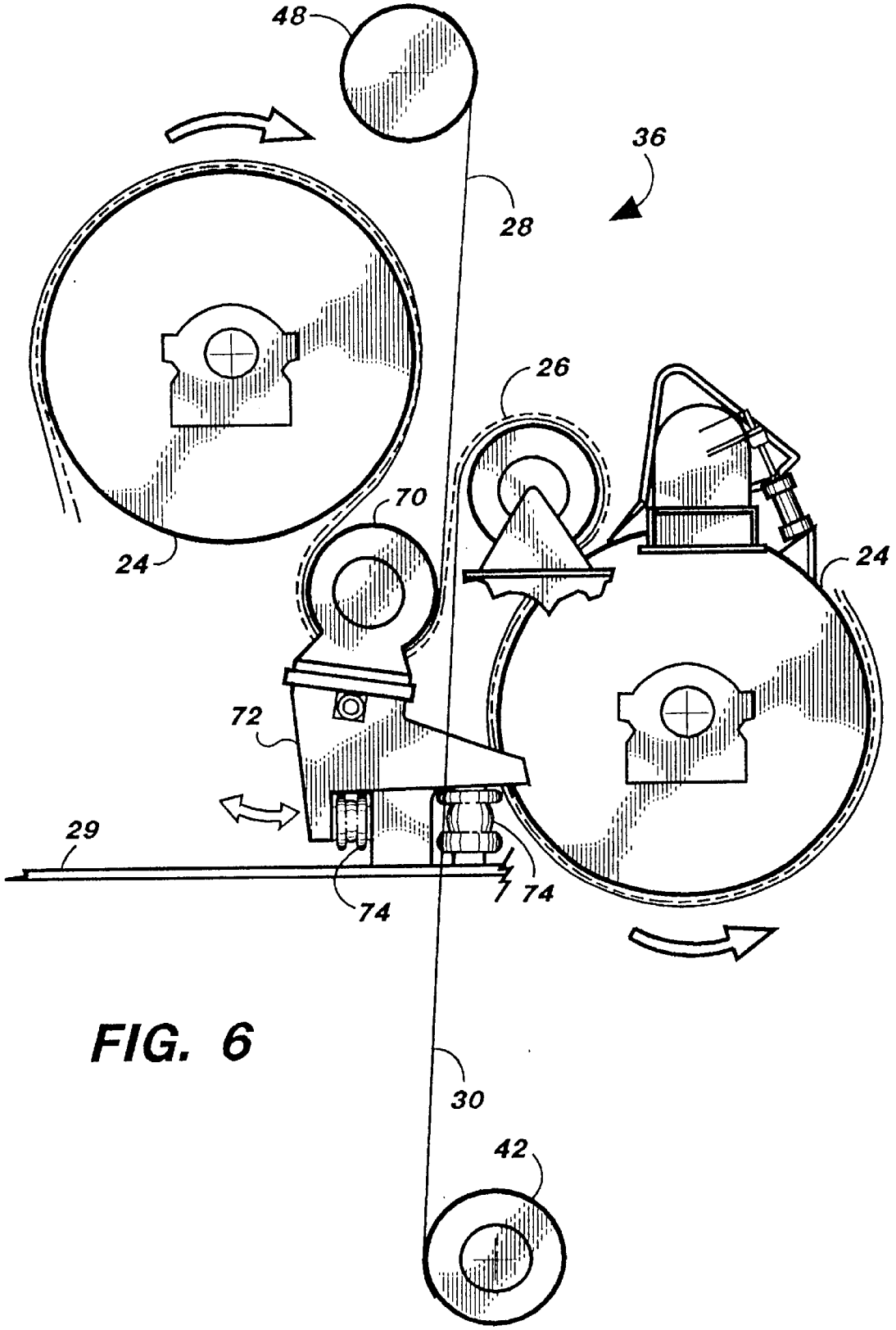
FIG. 6 is a side elevational view of a section break of the dryer run of FIG. 1 showing the web transfer arrangement from a top-felted dryer section to a bottom-felted dryer section.
Figure 7:
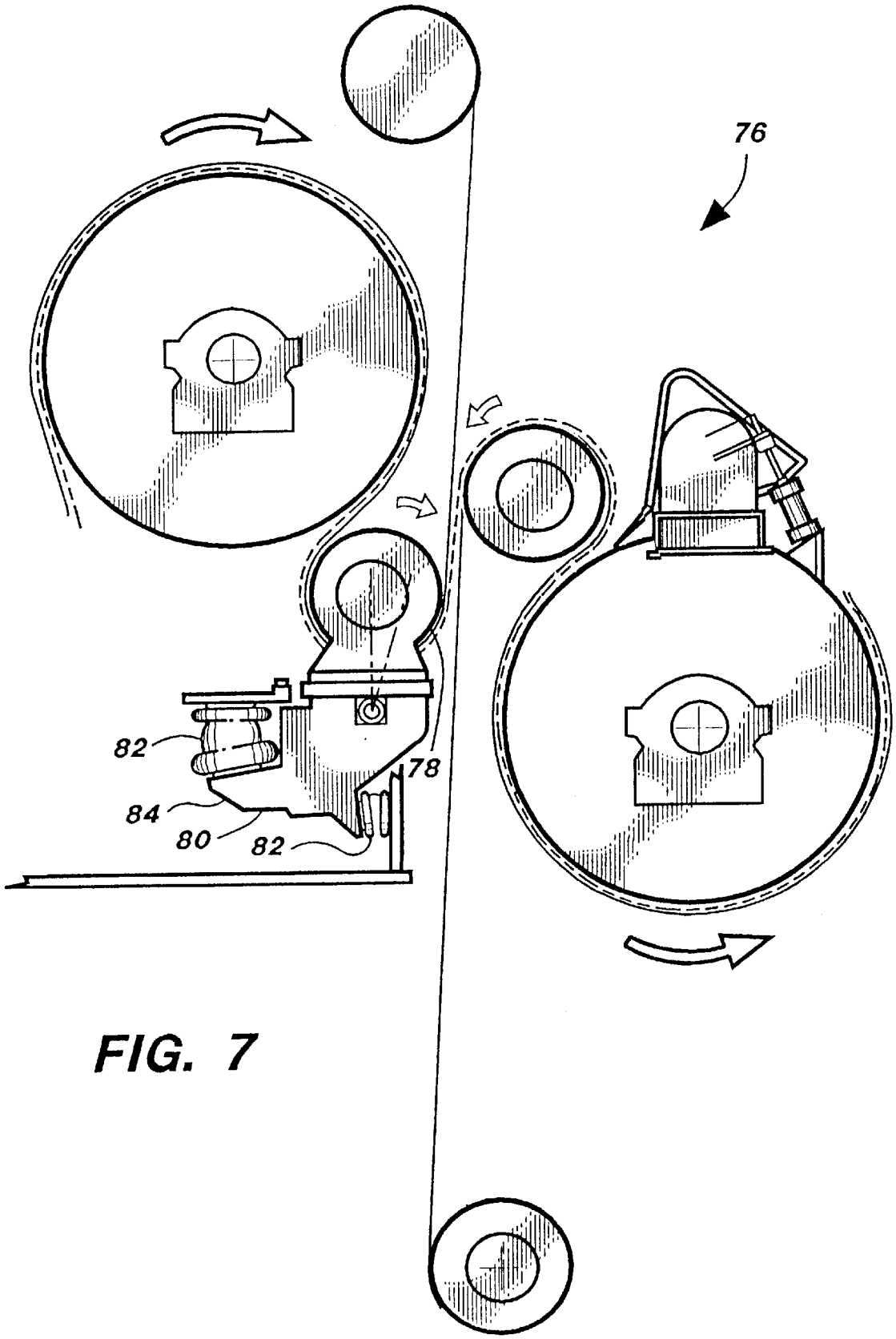
FIG. 7 is a side elevational view of an alternative embodiment vacuum roll pivot arrangement for a papermaking dryer of this invention.

As shown in FIG. 6, the transfer arrangement at the section break 36 from a top-felted dryer section 21 to a bottom-felted dryer section 20 is similar to the arrangement described above. A pivoting vacuum roll 70 is mounted on pivot arms 72 which are connected to the frame 29 to pivot about a cross-machine direction axis. Air rides 74 provide a means for pivoting the vacuum roll to alternately dispose the vacuum roll 70 with the top felt 28 and web 26 against the bottom felt 30. It should be noted that the pivot arm arrangement may be varied to suit particular machine geometry, for example as shown in the alternative embodiment arrangement 76 shown in FIG. 7. The apparatus 76 has a vacuum roll 78 which is connected to pivot arms 80 which are actuated by air rides 82. The pivot arms 80 have members 84 which extend upstream to which air rides are connected.

A section transfer with a single pivoting vacuum roll is a low cost approach to separating the felts at the transfer break. An alternative arrangement is shown in FIGS. 8 and 9, in which both vacuum rolls at the section transfer are pivotable.

Figure 8:
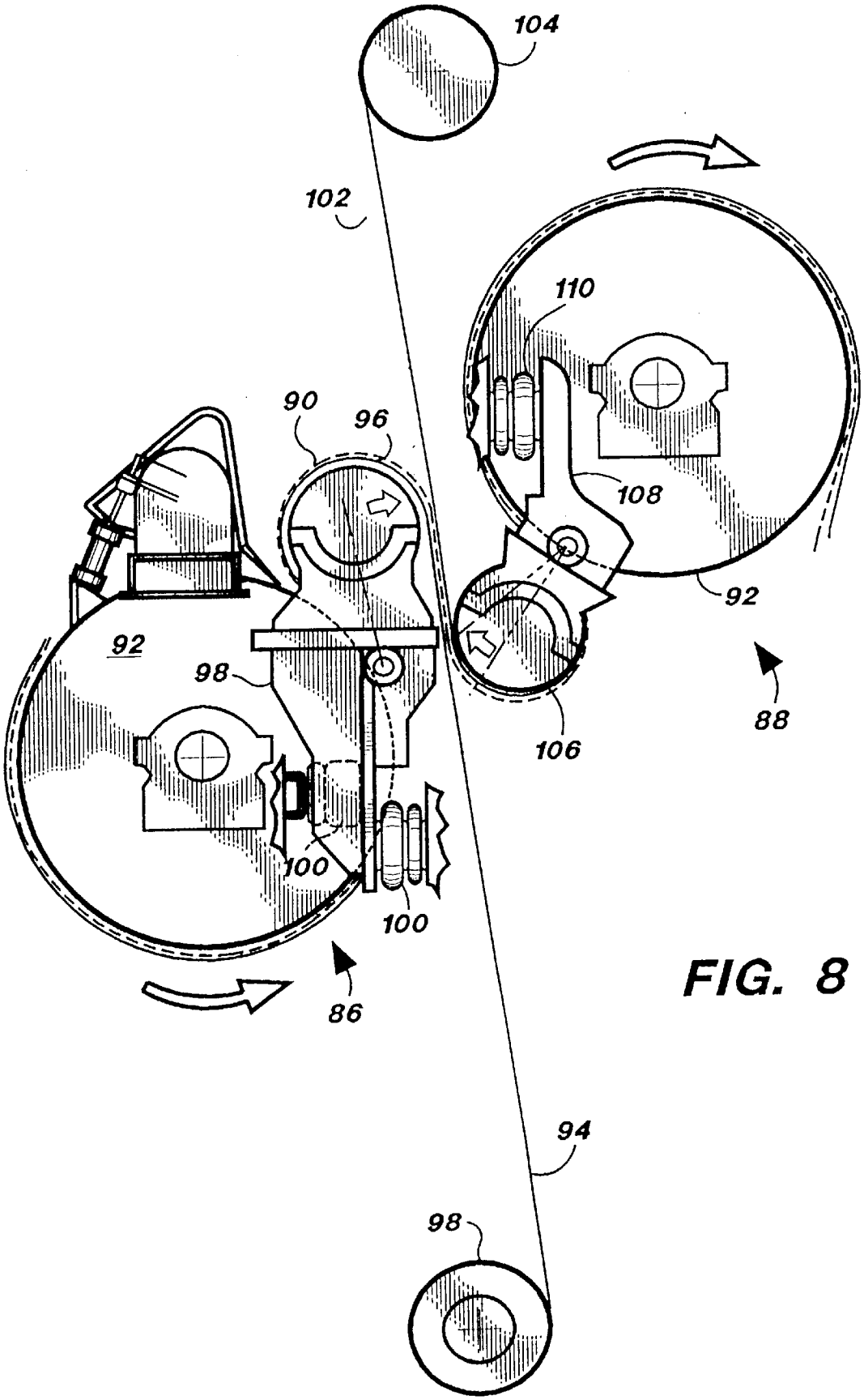
FIG. 8 is a schematic view of an alternative embodiment section break of this invention employing two pivoting vacuum rolls.

A transfer from a lower-felted dryer section 86 to an upper-felted dryer section 88 is shown in FIG. 8. The web 90 travels over a first dryer roll 92 backed by the lower felt 94 and then passes over a lower felt vacuum roll 96. The lower felt 94 is turned by the vacuum roll 96 to pass over the lower felt roll 98. The lower felt vacuum roll 96 is supported on pivot arms 98, and is driven to pivot upstream or downstream by air rides 100. The web passes from the lower felt to an upper felt 102 which moves from an upper felt roll 104 over an upper felt vacuum roll 106 which is pivotably mounted on pivot arms 108 to pivot toward and away from the lower felt vacuum roll 96. At least one set of air rides 110 are connected to the upper felt vacuum roll pivot arms to pivot the vacuum roll 106. The web 90 is backed by the upper felt 102. The two vacuum rolls 96, 106 may be pivoted together to form a sandwich of the two felts 94, 102 and the web 90, or pivoted apart to open up the sandwich.

Figure 9:
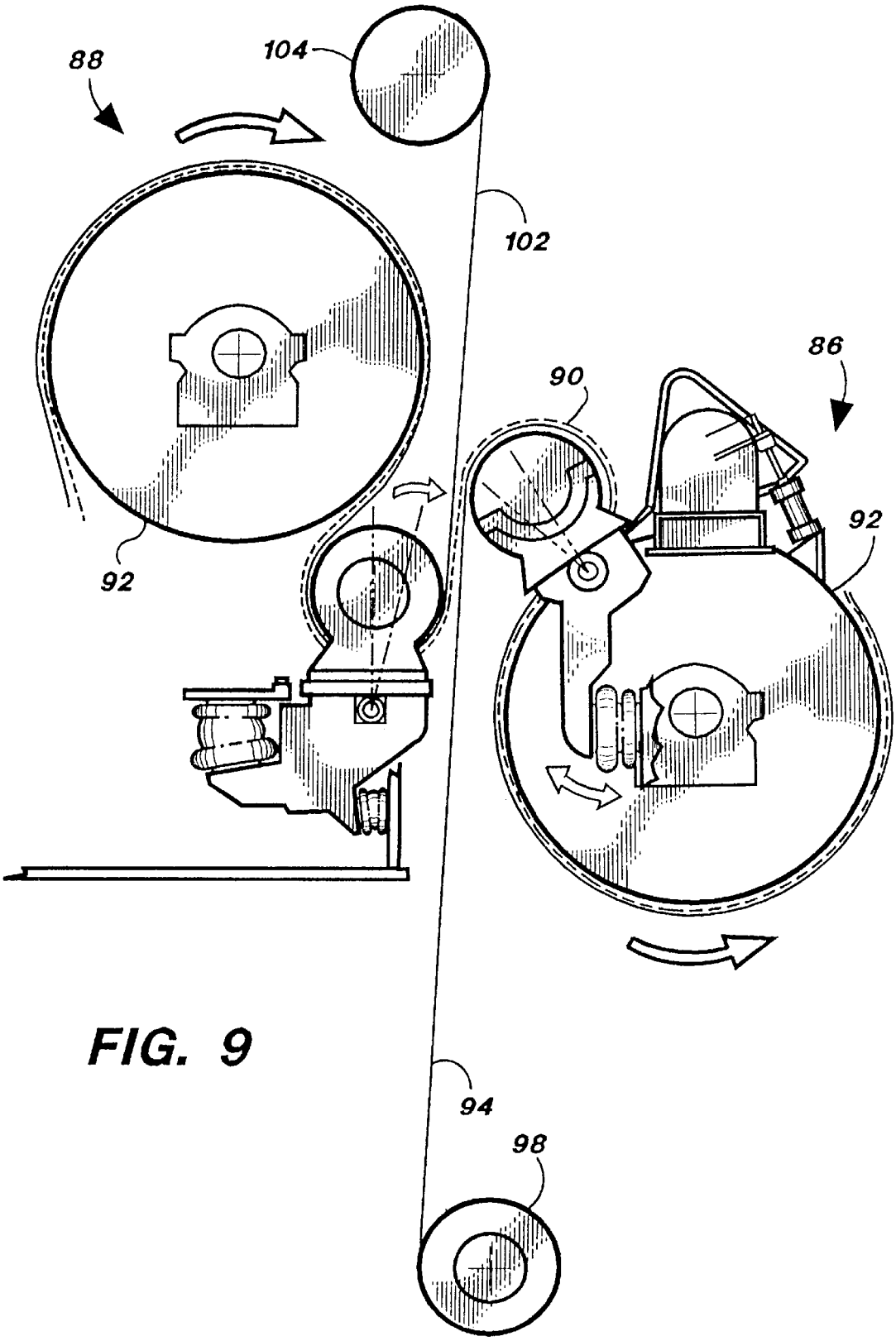
FIG. 9 is a schematic view of another alternative embodiment section break of this invention also employing two pivoting vacuum rolls.

A transfer from an upper-felted dryer section 88 to a lower-felted dryer section 88 is shown in FIG. 9.

Although the means for pivoting the vacuum rolls has been disclosed as inflatable air rides in conjunction with pivoting arms, it should be understood that alternative mechanisms for pivoting a vacuum roll may be employed, for example a linkage or cam arrangement.

It is understood that the invention is not limited to the particular construction and arrangement of parts herein illustrated and described, but embraces such modified forms thereof as come within the scope of the following claims.

I claim:

1. An apparatus for drying a web, comprising:

a frame;

a first dryer roll;

a pivot arm mounted to the frame for pivoting about a cross-machine axis;

a first vacuum roll downstream of the first dryer roll, wherein the first vacuum roll is rotatably mounted to the pivot arm;

a first felt guided about the first dryer roll such that the web is disposed between the first dryer roll and the first felt for drying a first side of the web, wherein the first felt extends over the first vacuum roll;

a second vacuum roll mounted to the frame downstream of the first vacuum roll;

a second dryer roll mounted downstream of the second vacuum roll;

a second felt guided about the second dryer roll such that the web is disposed between the second dryer roll and the second felt for drying a second side of the web, wherein the second felt extends from the second vacuum roll to the second dryer roll, and wherein the web is transferred from the first felt to the second felt between the first dryer roll and the second dryer roll; and means for pivoting the pivot arm, wherein the pivoting means causes the first vacuum roll to pivot from a first position in which the first felt, the web, and the second felt are engaged, and a second position in which the first felt, the web, and the second felt are not simultaneously engaged.

2. The apparatus of claim 1 wherein the means for pivoting the pivot arm comprises at least one inflatable member connected between the pivot arm and the frame, such that inflation of the member causes a pivoting of the vacuum roller.

3. The apparatus of claim 1 further comprising:

a second pivot arm pivotably mounted to the frame, wherein the second vacuum roller is rotatably mounted to the second pivot arm;

a means for pivoting the second pivot arm, wherein the first vacuum roll and the second vacuum roll may both be pivoted toward and away from one another.

4. The apparatus of claim 1 wherein the means for pivoting the pivot arm comprises:

a first inflatable member connected between the pivot arm and the frame and extending from the frame upstream to the pivot arm; and a second inflatable member connected between the pivot arm and the frame and extending from the frame downstream to the pivot arm, such that the inflatable members may be selectably inflated to position the first vacuum roll at a desired inclination.

5. An apparatus for drying a web, comprising:

a frame;

a first dryer roll;

a first vacuum roll downstream of the first dryer roll;

a first felt guided about the first dryer roll such that the web is disposed between the first dryer roll and the first felt for drying a first side of the web, wherein the first felt extends over the first vacuum roll;

a second vacuum roll mounted to the frame downstream of the first vacuum roll;

a second dryer roll mounted downstream of the second vacuum roll;

a second felt guided about the second dryer roll such that the web is disposed between the second dryer roll and the second felt for drying a second side of the web, wherein the second felt extends from the second vacuum roll to the second dryer roll, and wherein the web is transferred from the first felt to the second felt between the first dryer roll and the second dryer roll; and means for pivoting the first vacuum roll from a first position in which the first felt, the web, and the second felt are engaged, and a second position in which the first felt, the web, and the second felt are not simultaneously engaged.

6. The apparatus of claim 5 further comprising a means for pivoting the second vacuum roll from a first position in which the first felt, the web, and the second felt are engaged between the first vacuum roll and the second vacuum roll, and a second position in which the first vacuum roll and the second vacuum roll are pivoted away from one another.

7. An apparatus for drying a web, comprising:

a frame;

a first dryer roll rotatably mounted to the frame;

at least one pivot arm mounted to the frame for pivoting about a cross-machine axis;

a first vacuum roll downstream of the first dryer roll, wherein the first vacuum roll is rotatably mounted to the pivot arm;

a first felt guided about the first dryer roll such that the web is disposed between the first dryer roll and the first felt for drying a first side of the web, wherein the first felt extends over the first vacuum roll;

a second vacuum roll mounted to the frame downstream of the first vacuum roll;

a second dryer roll mounted downstream of the second vacuum roll;

a second felt guided about the second dryer roll such that the web is disposed between the second dryer roll and the second felt for drying a second side of the web, wherein the second felt extends from the second vacuum roll to the second dryer roll, and wherein the web is transferred from the first felt to the second felt between the first dryer roll and the second dryer roll; and an inflatable member connected between the pivot arm and the frame, wherein the inflatable member is inflatable and deflatable to cause the first vacuum roll to pivot between a first position in which the first felt, the web, and the second felt are engaged, and a second position in which the first felt, the web, and the second felt are not simultaneously engaged.

8. The apparatus of claim 7 further comprising a second inflatable member connected between the pivot arm and the frame and extending from the frame downstream to the pivot arm, such that the inflatable members may be selectably inflated to position the first vacuum roll at a desired inclination.

* * * * *